May 29, 1945.    S. MADSEN    2,376,929
MACHINE TOOL
Filed Feb. 20, 1942    2 Sheets-Sheet 1

INVENTOR
Sern Madsen
By Parker, Carlson, Pitzner & Hubbard
ATTORNEYS

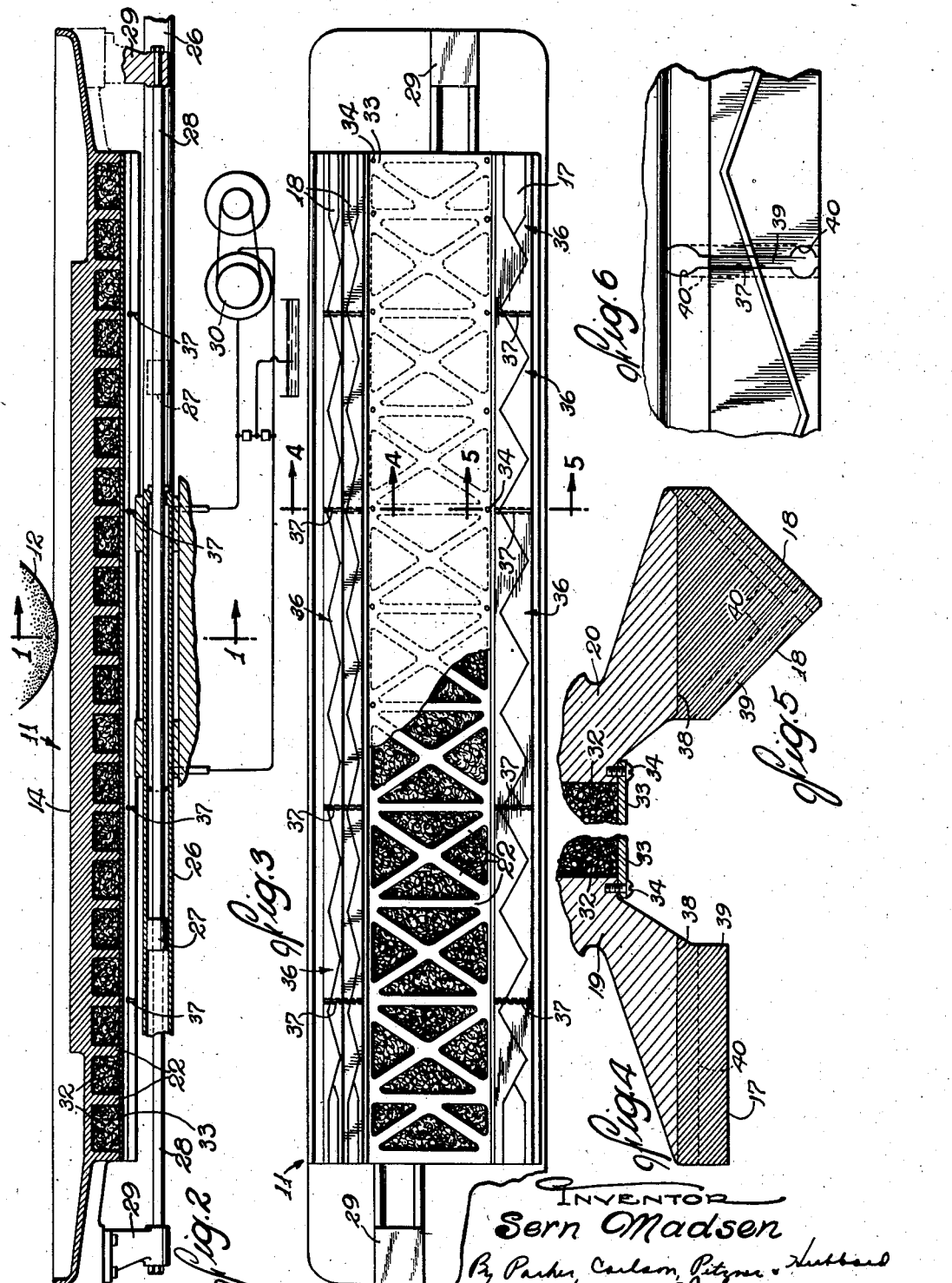

Patented May 29, 1945

2,376,929

UNITED STATES PATENT OFFICE 2,376,929

MACHINE TOOL

Sern Madsen, Rockford, Ill., assignor to Mattison Machine Works, Rockford, Ill., a corporation of Illinois Application February 20, 1942, Serial No. 431,611

7 Claims. (Cl. 308—3)

This invention relates to machine tools of the type in which the work, while being operated on, is supported on a work table of heavy rigid construction slidable back and forth along bed ways to present the work to a metal removing unit. Frequently, such reciprocation of the table is effected by hydraulic actuators including a cylinder disposed beneath the table.

In certain machine tools, particularly those such as grinders and planers wherein the table is actuated hydraulically or reciprocated for prolonged intervals at a comparatively high speed, the flat top surface of the table becomes distorted and this distortion is sufficient to produce objectionable inaccuracies in the finished work. I have discovered that such distortion is due to a comparatively small and quite widely variable temperature difference produced between the upper and lower sides of the table by sources of heat to which the underside of the table is subjected. One of these sources is rubbing friction produced between the coacting slideways even though the latter are lubricated adequately. Heat is also radiated to the table from the hydraulic actuator which becomes heated to a temperature depending on the extent of working of the pressure fluid. Coolant flowing down over the table top usually increases this temperature differential.

Based on this discovery, the primary object of the present invention is to reduce and substantially eliminate the distortion above referred to.

Another object is to provide means which is equally effective at all times in eliminating table distortion.

A further object is to incorporate in the construction of the table itself a simple and effective means for eliminating thermal distortion of the character referred to.

Still another object is to prevent table distortion by differential heating through the use of means which does not detract appreciably from the rigidity of the table construction.

The invention also resides in the novel character of the individual means provided to prevent distortion by heat from the different sources.

Other objects and advantages of the invention will become apparent from the following detailed description taken in connection with the accompanying drawings, in which Figure 1 is a fragmentary cross-section of a grinding machine equipped with the present invention, the section being along the line 1—1 of Fig. 2.

Fig. 2 is a fragmentary longitudinal sectional view, taken along the line 2—2 of Fig. 1.

Fig. 3 is a bottom view of the work table.

Figs. 4 and 5 are sections taken respectively along the lines 4—4 and 5—5 of Fig. 3.

Fig. 6 is a fragmentary side elevation of that part of the table shown in Fig. 5.

Figure 1:
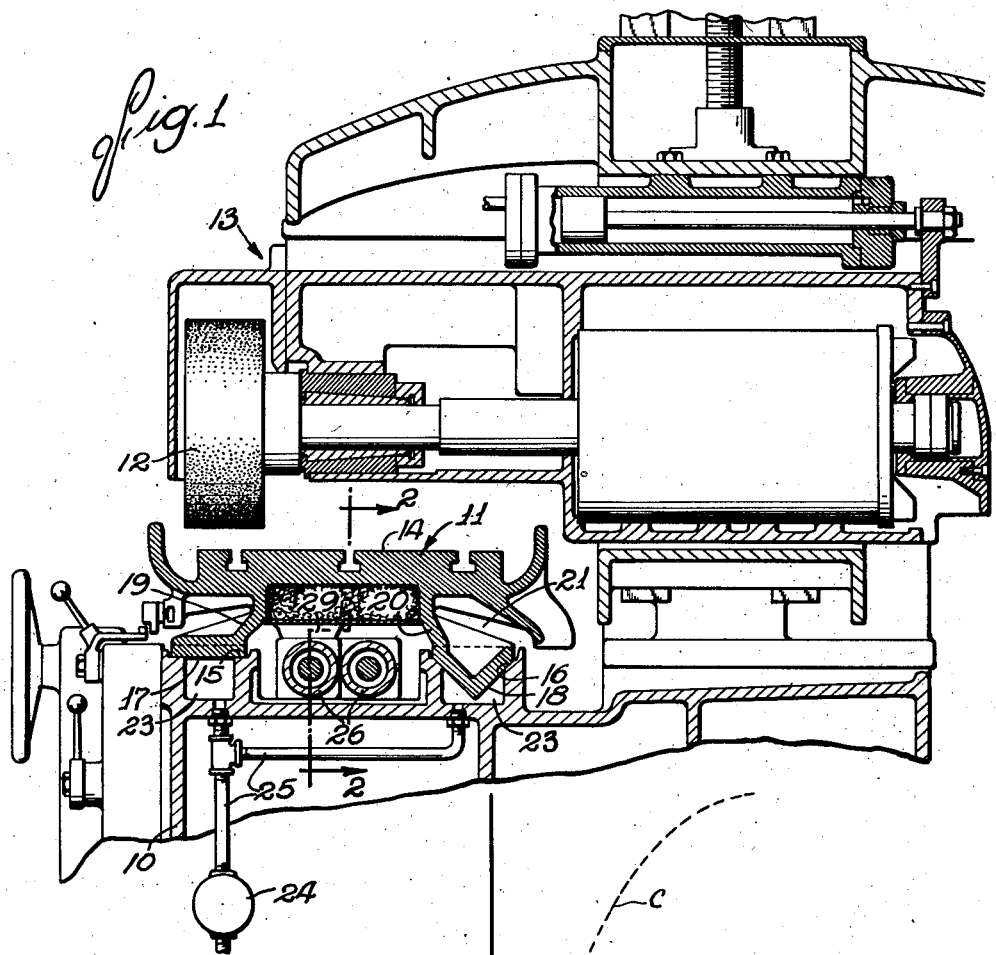
Figure 7:
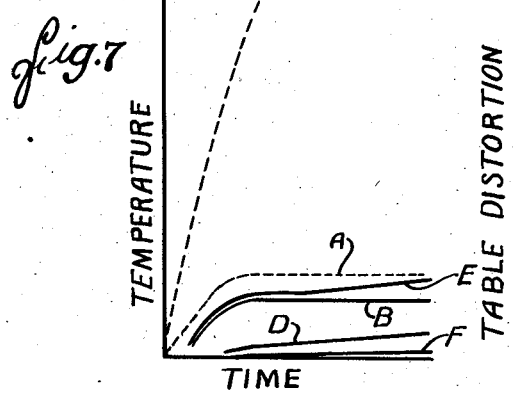

Fig. 7 is a chart of temperature and distortion curves.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

As illustrative of the type of machine in which the invention is useful, I have shown in the drawings a surface grinder comprising generally a bed 10, a work table 11 supported on the bed for endwise reciprocation, and a power rotated grinding wheel 12 mounted on a head 13 which may be adjusted vertically to bring the wheel into and out of engagement with the upper surface of a work piece clamped on the top 14 of the table. As is common in practice, two elongated ways 15 and 16 formed along opposite sides of the bed receive mating way surfaces 17 and 18 formed on ribs 19 and 20 depending from the under side of the table. The ribs may be of the cantilever construction shown to provide side recesses 21 into which may be extended suitable stationary guards for excluding grit and dirt from the ways. The table, which is usually a thick iron block with the ribs cast integral therewith, is positioned laterally in the present instance by making one pair of the ways of generally V-shape. If desired, the weight of the table may be reduced while maintaining the proper rigidity by providing cross ribs 22 on the under side between the ribs 19 and 20. Recesses 23 in the bed interrupt the bed ways 15 and 16 and are filled with lubricant which is delivered through pipes 25 by a pump 24 so that the coacting way surfaces are pressure lubricated.

In the present instance, the table is reciprocated back and forth by two hydraulic actuators each comprising a cylinder 26 fixed to the bed and a piston 27 therein having its rod 28 connected to a lug 29 on one end of the table. The rod of the other piston is similarly connected to the opposite end of the table. Valve means (not shown) controlled automatically in response to table reciprocation are provided for directing pressure fluid from a pump 30 first into one cylinder and then into the other to move the table back and forth.

Despite the efficient lubrication of the way surfaces, I have discovered that the rubbing friction occurring during rapid reciprocation of the table for a prolonged interval causes the ways 17 and 18 to be heated to a temperature several degrees above the upper surface 14 of the table which surface is usually maintained at about room temperature by the coolant flowed thereon as above described. As illustrated by the curve A, such differential heating develops gradually after the machine has been started and then becomes substantially uniform after a prolonged interval of continuous operation. The warping of the table due to this differential alone results in raising of the ends of the table surface 14 above the center as shown by the curve B. At the same time, the hydraulic fluid flowing through the control valves and conduits is worked so that the fluid and therefore the cylinders 26 become heated as shown by the curve C. This heat is radiated to the under side of the table and this alone produces further warping in amounts shown by the curve D. The total distortion due to the two sources of heat is shown by the curve E. The distortion becomes noticeable after the machine has been in operation several minutes and increases progressively, finally becoming somewhat stabilized after prolonged continuous reciprocation. Thus, with a machine that is operated intermittently, the degree of distortion varies widely and at any particular time depends on the temperature differential prevailing.

The invention contemplates the provision of means for preventing table distortion at all times and under all operating conditions. Herein, one means functions to prevent radiation of heat from the hydraulic cylinders to the under side of the table. This means comprises insulation 32 filling the recesses between the ribs 22 on the under side of the table and covering the latter. The insulation may be held in place by a plate 33 secured to the table by screws 34. By thus carrying the insulation on the table, the heat is not confined in the cylinders and it is still possible to utilize the large radiating surface of the cylinders as a means for dissipating heat and thereby prevent excessive heating of the hydraulic system.

While the frictional heat created at the coacting slideways may be dissipated in various ways to prevent table distortion, it is preferred, for the sake of simplicity and reliability under all service conditions, to permit absorption of this heat in the table itself and to construct the table in a novel manner such as to avoid distortion of the top surface by the heat thus absorbed. For this purpose, the bottom portion of the table receiving the heat is divided longitudinally into a series of sections indicated generally at 36 which sections may when heated warp or expand individually relative to the rigid table proper. Herein, the sections are separated longitudinally so that the way surfaces 17 and 18 contact the bed ways 15 and 16 over a plurality of spaced areas with the result that the flatness of the upper table surface is not destroyed even though there is a temperature differential of several degrees.

To thus divide the table without at the same time sacrificing the required table rigidity, the ribs 19 and 20 are cut transversely to form narrow slots 37 at spaced intervals. Preferably, the slots are not as deep as the ribs as indicated by the positions of their roots 38. Preferably, the slots are formed at about two foot intervals and are about $\frac{1}{16}$ of an inch wide, each extending completely across the table ways. With this construction, the intermediate rib sections 36 between two adjacent slots and the terminal sections are free to expand under the heat applied at its way surface so that any bowing of this surface that results will be confined to such section. Such bowing will, of course, be so extremely small that the lubricant ordinarily applied to such slideways will keep the spaces between the coacting way surfaces filled completely and avoid excessive unit pressure at any point.

To minimize the loss of pressure fed lubricant out from the coacting way surfaces through the slots 37, the latter are preferably filled with a soft metal 39 such as lead or babbitt which contracts slightly on solidifying from the molten state. Thus, after the slots are cut in the ribs, they are filled with the molten metal. To hold the filling in place, the roots of the slots may be enlarged as indicated at 40 and these enlargements also filled. On cooling of the metal 39 in the slots, very small cracks are left at the slot walls and these are of sufficient width to allow for the required expansion of the intervening rib sections 36.

With the table equipped as above described, it has been possible to nullify the effect of the increased temperature to which the underside of the table is subjected from various sources of heat and thereby eliminate distortion of the top surface 14 of the table or at least to reduce it to an almost unmeasurable amount as shown by the curve F, and this, even under the most unfavorable conditions of service use. As a result, it is possible to form perfectly flat surfaces on very heavy work pieces during reciprocation of the table at high speed and for prolonged intervals.

I claim as my invention:

1. The combination of a slideway, a rigid metal table having a way mating with said slideway and supported thereby, said table having a slot therein extending transversely of said way to divide the portion of the table adjacent said way into a plurality of longitudinal sections, and a filling solidified in said slot and comprising a material which contracts on solidifying.

2. The combination of a slideway, a rigid metal table having a way mating with said slideway and supported thereby, said table having a slot therein extending transversely of said way to divide the portion of the table adjacent said way into a plurality of longitudinal sections, and means substantially filling said slot while permitting freedom of thermal expansion of said sections.

3. The combination of means providing a slideway, a rigid machine element having a way on one side thereof mating with said slideway and having a transverse slot dividing the way longitudinally into a plurality of spaced sections adapted for independent thermal expansion, a recess in said slideway filled with lubricant under pressure, and means filling said slot to substantially prevent the escape of said lubricant through said slot while permitting of said independent expansion.

4. The combination of means providing a slideway, a rigid metal machine element slidable along said slideway and adapted to absorb frictional heat created at the coacting way surfaces, and means dividing the way surface of said element and the adjacent part of the element into a plurality of separately expansible longitudinal parts while retaining the rigidity of the remainder of said element.

5. In a machine tool, in combination, means forming spaced parallel guideways, a rigid metal table including a flat top portion and depending ribs having way surfaces adapted to engage said guideways and slidably support the table thereon, said ribs being slotted to a substantial depth transversely of their respective way surfaces so as to divide the ribs into sections adapted for independent thermal expansion by the heat generated frictionally through the engagement of the way surfaces and the guideways during the reciprocation of the table.

6. In a machine tool, the combination of means providing spaced parallel guideways, elongated members engageable in said guideways and slidably supported thereby, a rigid metal table including a flat top portion and connected to said members so as to be supported thereby, each of said members being divided into longitudinal portions adapted for individual thermal expansion relative to the table whereby to nullify the effect of differential heating between the engaged side of said members and the top of said table.

7. In a machine tool, the combination of means providing spaced parallel guideways, elongated members engageable in said guideways and slidably supported thereby, a rigid metal table including a flat top portion, connecting means between said members and the upper side of said table supporting the latter, and means dividing each of said members into longitudinal portions expansible individually relative to said table in response to frictional heating of the members during sliding thereof along said guideways.

SERN MADSEN.

CERTIFICATE OF CORRECTION.

Patent No. 2,376,929. May 29, 1945.

SERN MADSEN.

It is hereby certified that error appears in the printed specification of the above numbered patent requiring correction as follows: Page 3, second column, line 13, claim 7, for the word "upper" read --under--; and that the said Letters Patent should be read with this correction therein that the same may conform to the record of the case in the Patent Office.

Signed and sealed this 18th day of September, A. D. 1945.

Leslie Frazer (Seal) First Assistant Commissioner of Patents.